(12) United States Patent
Wright

(10) Patent No.: US 12,285,135 B2
(45) Date of Patent: Apr. 29, 2025

(54) FOOTBALL-THEMED COOKING GRILL

(71) Applicant: April Lynn Wright, Pasadena, CA (US)

(72) Inventor: April Lynn Wright, Pasadena, CA (US)

( * ) Notice: Subject to any disclaimer, the term of this patent is extended or adjusted under 35 U.S.C. 154(b) by 785 days.

(21) Appl. No.: 17/532,804

(22) Filed: Nov. 22, 2021

(65) Prior Publication Data
US 2022/0160175 A1    May 26, 2022

Related U.S. Application Data

(60) Provisional application No. 63/117,663, filed on Nov. 24, 2020.

(51) Int. Cl.
| | |
|---|---|
| A47J 37/07 | (2006.01) |
| A47J 36/06 | (2006.01) |
| A47J 36/32 | (2006.01) |
| A47J 47/00 | (2006.01) |
| F24C 7/08 | (2006.01) |

(52) U.S. Cl.
CPC ............ *A47J 37/0786* (2013.01); *A47J 36/06* (2013.01); *A47J 36/32* (2013.01); *A47J 37/0709* (2013.01); *A47J 47/005* (2013.01); *F24C 7/082* (2013.01); *A47J 2202/00* (2013.01)

(58) Field of Classification Search
CPC ............ A47J 37/0611; A47J 2037/0617; A47J 37/06; A47J 37/0676; A47J 37/049; A47J 37/0629; A47J 37/0786; A47J 36/06; A47J 36/32; A47J 37/0709; A47J 47/005; A47J 2202/00; F24C 7/082
USPC ......... 99/325, 331, 339, 342, 344, 351, 372, 99/375, 376, 422, 425, 450.1
See application file for complete search history.

(56) References Cited

U.S. PATENT DOCUMENTS

| | | |
|---|---|---|
| D385,146 S | 10/1997 | Fielding |
| D482,230 S | 11/2003 | Lai |
| D638,660 S | 5/2011 | Ayers |
| D712,190 S | 9/2014 | Talley |
| 2007/0125358 A1 | 6/2007 | Tripp |

(Continued)

OTHER PUBLICATIONS

Gibson Home Football 13-In W Brown Kettle Charcoal Grill, Retrieved from Internet, Retrieved on Sep. 10, 2021 <URL: https://www.lowes.com/pd/Gibson-Home-Gibson-Home-18-in-Steel-Football-Barbecue-Grill-in-Brown/1001731928>.

*Primary Examiner* — Phuong T Nguyen

(57) ABSTRACT

A football-themed cooking grill is an apparatus utilizing an openable oblong enclosure, with dimensions approximately scaled from those of a standard National Football League (NFL) football, to both support various foods and retain heat and smoke while cooking. The cooking surface provides an indented portion optimized for enhanced retention of an appropriately-sized pot or other cooking receptacle. Furthermore, the shapes of different components of the apparatus reminds the user and guests of the social theme of the day. The legs of the apparatus are shaped to suggest the end-zone uprights used for scoring on either end of a football field. Football-shaped imprints on the cooking surface allow the user to brand foods, especially steaks, burgers and other meats, with football shapes. While coal and wood grills offer different types and flavors of smoke with which to potentially flavor food, the apparatus may also offer the option for solar-powered electrical cooking.

12 Claims, 7 Drawing Sheets

(56) References Cited

U.S. PATENT DOCUMENTS

2012/0285438 A1* 11/2012 Serrano .............. A47J 37/0704
126/25 R
2018/0263415 A1* 9/2018 Hackley .............. A47J 37/0786

* cited by examiner

FOOTBALL-THEMED COOKING GRILL

The current application claims a priority to the U.S. Provisional Patent application Ser. No. 63/117,663 filed on Nov. 24, 2020.

FIELD OF THE INVENTION

The present invention relates generally to a food preparation tool. More specifically, the present invention is a football-themed cooking grill that is capable of simultaneously grilling food and expressing enthusiasm for a social event, specifically, a football game.

BACKGROUND OF THE INVENTION

Grilling is a method of cooking that involves dry heat applied to the surface of food, commonly from above, below, or from the side. Preparing food on a grill can greatly enhance the flavor of food. Such preparation has found a cultural foothold among sports enthusiasts. Tailgating, the act of hosting a party before a sporting event, often utilizes one of several varieties of grills as a communal centerpiece, around which guests tend to congregate. Hot dogs, burgers, skewers, corn, and many other foods can enjoy the heat of a direct flame, electronic heating surface, and more while further benefiting from exposure to flavor-enhancing smoke.

Unfortunately, many grills fall short of allowing for a variety of different types of cooking while simultaneously providing many desirable features that would enhance a sporting event. While a grill grate is an excellent surface for preparation of foods such as burgers and hot dogs, the grate falls short of providing an adequate space for supporting a pot or pan, as for gumbo, chili, or a variety of other such foods. A pot may slide or shift across the grill grate while the user is preparing other foods or operating the lid.

Furthermore, standard grills do little to enhance the social atmosphere desired by tailgaters before a big game. What is needed is a device that can support a variety of different cooking tools optimally and conveniently during food preparation. Further desirable is a grill that can visually contribute to a fan's enjoyment of a sports event.

The present invention addresses these issues. The football-themed cooking grill utilizes an openable oblong enclosure, with dimensions approximately scaled from those of a standard National Football League (NFL) football, to both support various foods and to retain heat and smoke while cooking. The cooking surface may provide an indented portion optimized for enhanced retention of an appropriately-sized pot or other cooking receptacle. Furthermore, the shapes of different components of the present invention may remind the user and guests of the social theme of the day. The legs of the present invention are shaped to suggest the end-zone uprights used for scoring on either end of a football field. Football-shaped imprints on the cooking surface allow the user to effectively brand foods, especially steaks, burgers and other meats, with football shapes. While coal and wood grills offer different types and flavors of smoke with which to potentially flavor food, the present invention may also offer electrical cooking via solar panels dispersed across the lid of the enclosure.

DETAILED DESCRIPTION OF THE INVENTION

All illustrations of the drawings are for the purpose of describing selected versions of the present invention and are not intended to limit the scope of the present invention.

Figure 1:
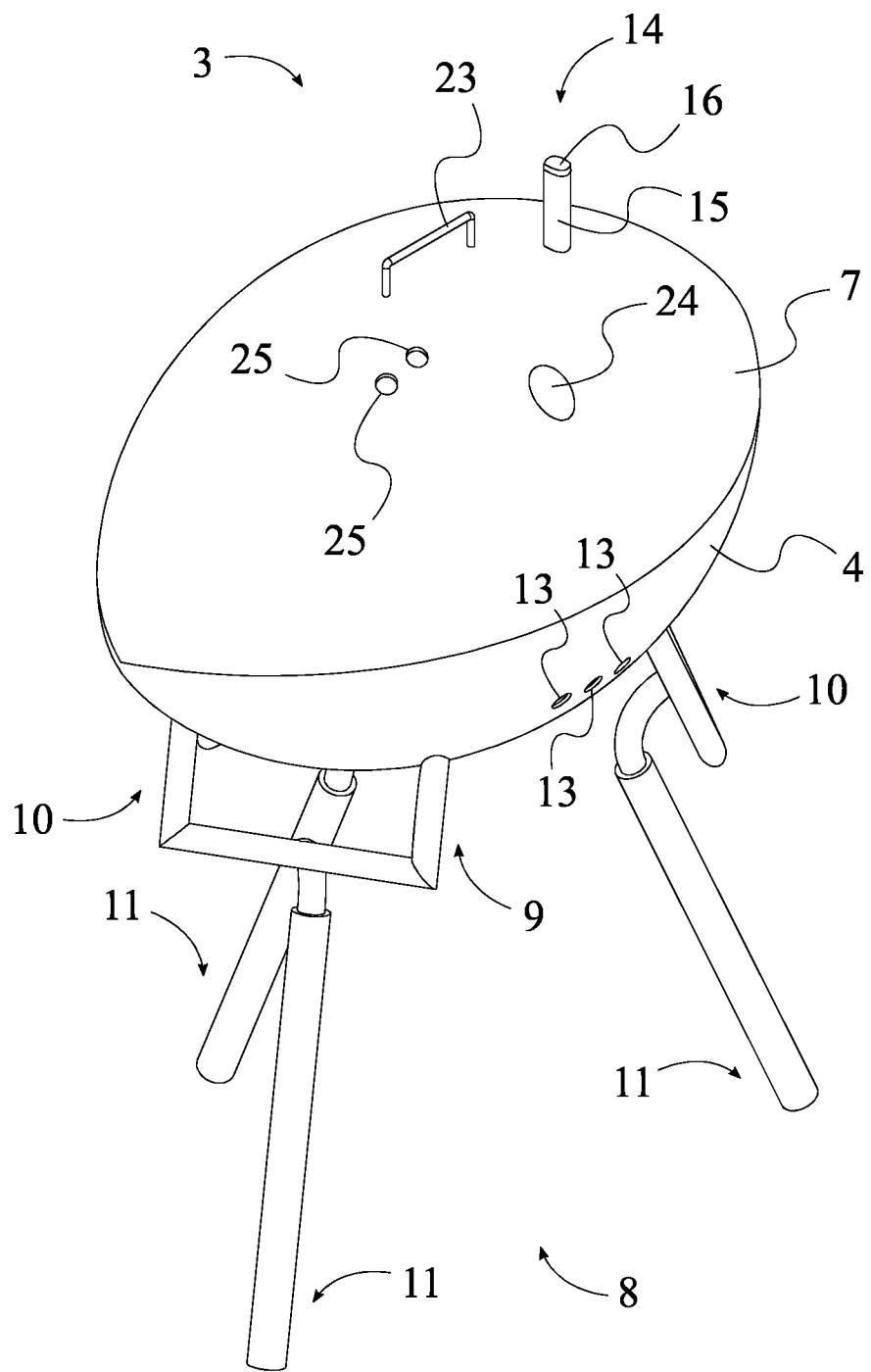
FIG. 1 is a right perspective view of the present invention, with the oblong-shaped enclosure closed.

The present invention is a football-themed cooking grill that is used to prepare foods for consumption by providing an enclosed, high temperature cooking space. The present invention is also configured to enhance enjoyment of a football game or football event by employing features that are football-themed. The present invention comprises a grilling grate 1, an oblong-shaped enclosure 3, a plurality of forked legs 8, at least one branding feature 12, at least one intake 13, and at least one exhaust 14, as shown in FIG. 1. The grilling grate 1 is the panel upon which food items may be placed for grilling purposes. The grilling grate 1 may be made of any of a variety of materials, especially metals such as iron or various steels, that are capable of capturing and retaining a high amount of radiative or conductive heat from a heating source. The oblong-shaped enclosure 3 is a hollow receptacle, preferably shaped generally like a National Football League (NFL) football, which allows for the generation of a thermally-controlled volume of space that is optimal for cooking different foods. The plurality of forked legs 8 is a set of supports generally resembling football goalposts that allow for support of the oblong-shaped enclosure 3. The at least one branding feature 12 is an ornamental or decorative design cut into or protruding from the grilling grate 1, thus allowing users to apply a decoration to their foods, especially to various meats. The at least one intake 13 is an opening through which air may enter the oblong-shaped enclosure 3, providing the oxygen necessary to sustain a flame beneath the grilling grate 1. The at least one exhaust 14 is an opening through which air and smoke may exit the oblong-shaped enclosure 3, thus allowing for regulation of temperature and pressure within the oblong-shaped enclosure 3 while grilling.

Figure 2:
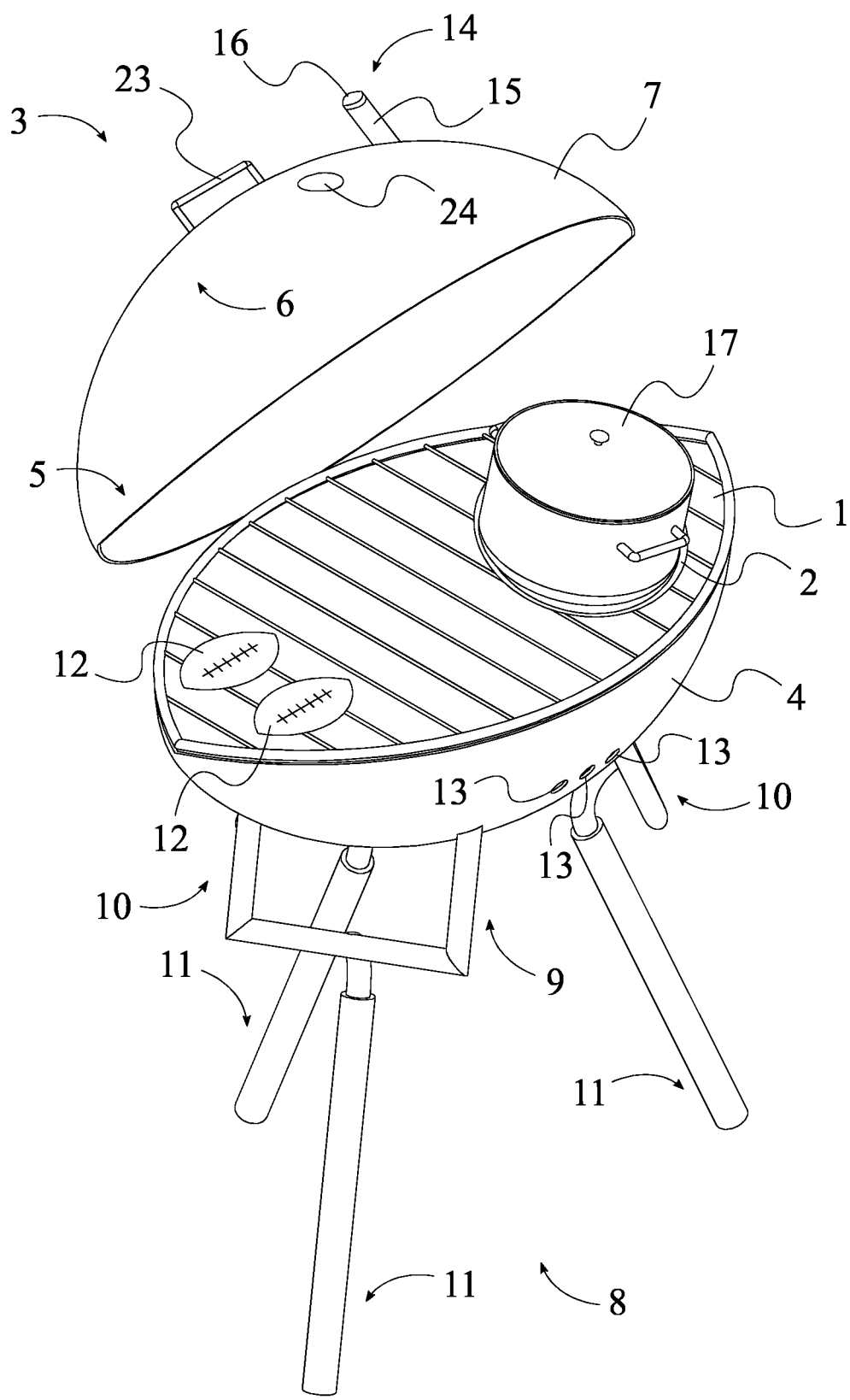
FIG. 2 is a right perspective view of the present invention, with the oblong-shaped enclosure open.

The general configuration of the aforementioned components allows the present invention to efficiently and effectively prepare food, especially before or during a sporting event. The oblong-shaped enclosure 3 comprises a base portion 4 and a lid portion 7, as shown in FIG. 2. The base portion 4 is the segment of the oblong-shaped enclosure 3 that allows for support of the lid portion 7 and the grilling grate 1, as well as, in a preferred embodiment, coals, wood, or other material capable of sustaining a fire. The lid portion 7 is the segment of the oblong-shaped enclosure 3 that allows a user to toggle the opened/closed status of the oblong-shaped enclosure 3 during cooking. The base portion 4 and the lid portion 7 may each comprise an open end 5 and a closed end 6. The open end 5 is the section of the base portion 4 and the lid portion 7 that generally faces food, thereby forming the thermal chamber within which food may be prepared. The closed end 6 is the section of the base portion 4 and the lid portion 7 that generally prevents the escape of cooking gases and liquids and simultaneously protects the contents of the oblong-shaped enclosure 3 from potential damage or contamination due to environmental effects, projectiles, and more. Each of the plurality of forked legs 8 may comprise a first proximal leg end 9, a second proximal leg end 10, and a distal leg end 11. The first proximal leg end 9 is an extended protrusion adjacent to the second proximal leg end 10 which supports the base portion 4. Similarly, the second proximal leg end 10 is an extended protrusion adjacent to the first proximal leg end 9 which supports the base portion 4. The distal leg end 11 is an elongated protrusion that, in the preferred usage of the present invention, contacts the ground during use. Together, the first proximal leg end 9, the second proximal leg end 10, and the distal leg end 11 generally resemble a football upright or goalpost.

Figure 4:
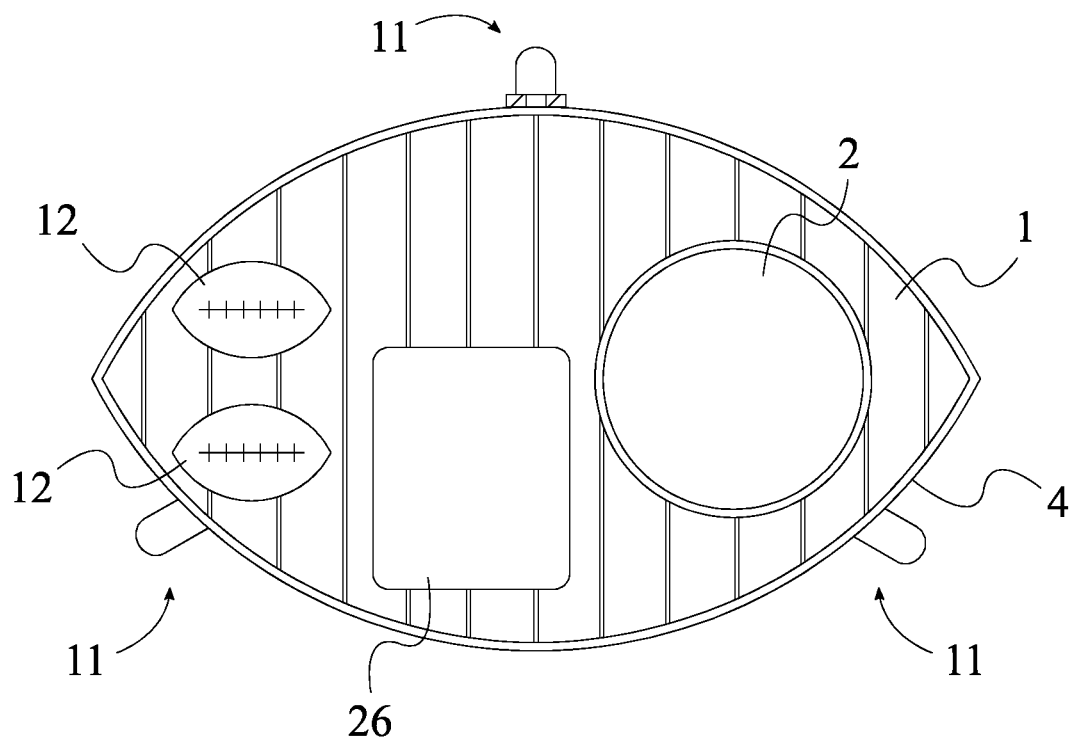
FIG. 4 is a cross-sectional view taken along line 4-4 in FIG. 3.

The aforementioned components must combine to allow for optimal preparation of food, particularly around a football game. The base portion 4 may be hingedly connected to the lid portion 7, as shown in FIG. 4. This arrangement allows the oblong-shaped enclosure 3 to open for addition or removal of food and close in order to expose food to heat and smoke. The grilling grate 1 may be removably mounted across the open end 5 of the base portion 4. This arrangement ensures that the grilling grate 1 is optimally positioned for the addition, manipulation, and removal of food. The at least one branding feature 12 may be integrated into the grilling grate 1. In this way, a user may place food atop the at least one branding feature 12 to imprint the food with the at least one branding feature 12. The plurality of forked legs 8 may be radially positioned around the closed end 6 of the base portion 4. Thus, the base portion 4 may be optimally supported by the plurality of forked legs 8. In an exemplary embodiment, the plurality of forked legs 8 may be angled towards the closed end 6 of the base portion 4, thereby providing a stable base of support during use. The first proximal leg end 9 and the second proximal leg end 10 may be fixed onto the base portion 4, adjacent to the closed end 6 of the base portion 4. This arrangement allows the first proximal leg end 9 and the second proximal leg end 10 to support the base portion 4 in position above the distal leg end 11. The first proximal leg end 9 and the second proximal leg end 10 may be positioned offset from each other. In this way, the first proximal leg end 9 and the second proximal leg end 10 both provide more distributed support and simultaneously are designed to more accurately resemble football goalposts. The distal leg end 11 may be oriented away from the open end 5 of the base portion 4. This arrangement ensures that the distal leg end 11 is arranged appropriately to ensure that the first proximal leg end 9 and the second proximal leg end 10 can hold the base portion 4 above the ground. The at least one intake 13 may be integrated into the base portion 4. In this way, the at least one intake 13 is positioned appropriately to allow air to fuel the heat source contained within the base portion 4. The at least one exhaust 14 may be integrated into the lid portion 7. Thus, the at least one exhaust 14 is positioned appropriately to allow hot air and smoke to exit the oblong-shaped enclosure 3 through the lid portion 7.

The grilling grate 1 may be adapted for use by different types of cooking vessels, such as pots, pans, trays, and more. To allow for this, the grilling grate 1 may comprise at least one cookware-receiving indentation 2, as shown in FIG. 4. The at least one cookware-receiving indentation 2 is a depression shaped for intuitive positioning and optimal retention of cooking vessels. The at least one cookware-receiving indentation 2 may be integrated into the grilling grate 1. This arrangement allows the at least one cookware-receiving indentation 2 to position cookware atop the grilling grate 1. The at least one cookware-receiving indentation 2 is oriented towards the closed end 6 of the lid portion 7. Thus, items placed onto the at least one cookware-receiving indentation 2 are appropriately arranged to absorb heat from grilling grate 1. Additionally, the present invention may further comprise a cooking pot 17. The cooking pot 17 is a deep, high-walled cooking device that is ideal for retaining large amounts of foods and liquids together. The cooking pot 17 may be situated into the at least one cookware-receiving indentation 2. This arrangement prevents the cooking pot 17 from sliding or shifting during use of the cooking pot 17 or of other items contained within the oblong-shaped enclosure 3.

Figure 6:
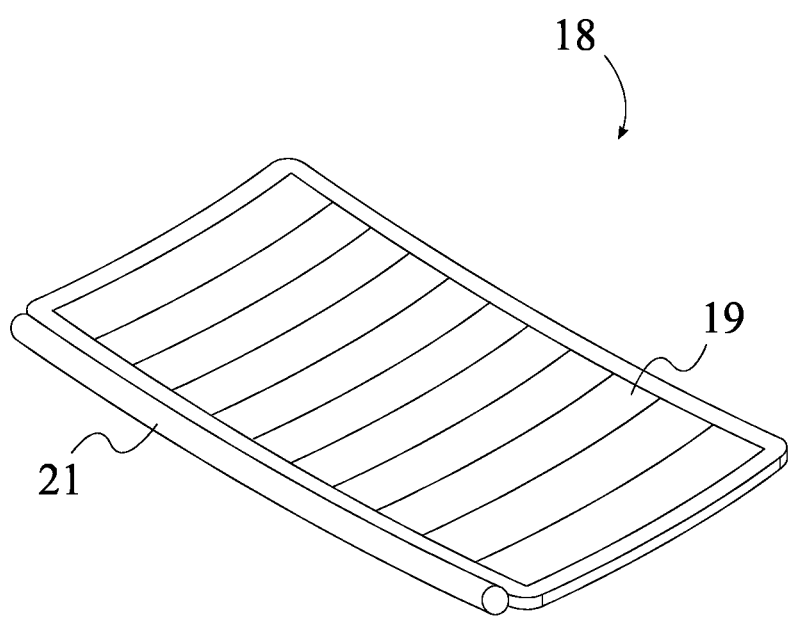
FIG. 6 is a right perspective view of an embodiment of the present invention showing a cutting board.

A user of the present invention may wish to prepare food by chopping or mixing before placing atop the grilling grate 1. To this end, the present invention may further comprise a cutting board 18 and a lockable hinge mechanism 21, as shown in FIG. 6. The cutting board 18 is a rigid unit capable of providing a steady surface upon which a user may cut, chop, or otherwise prepare ingredients for cooking. In an exemplary embodiment, the cutting board 18 may be shaped or decorated to resemble a football field, thereby further enhancing the thematic elements appropriate for a football tailgate or party. The lockable hinge mechanism 21 is a device which allows the cutting board 18 to hinge and lock into an optimal position for food preparation. The cutting board 18 may be connected adjacent to the open end 5 of the base portion 4 by the lockable hinge mechanism 21. This arrangement allows the cutting board 18 to receive support from the base portion 4 through the lockable hinge mechanism 21.

Figure 7:
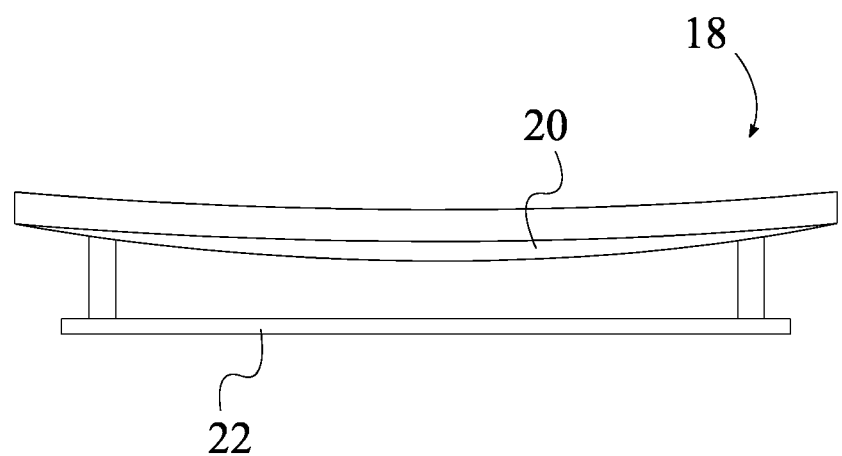
FIG. 7 is a right view of an embodiment of the present invention showing a cutting board with a rod-type cooking tool hanger.

The cutting board 18 may be made more useful through the addition of useful features that can better retain ingredients during use. To this end, the cutting board 18 may comprise a concave face 19 and a convex face 20, as shown in FIG. 7. The concave face 19 is the surface of the cutting board 18 that, in the preferred usage of the present invention, supports items and foods, preventing them from rolling or falling off the cutting board 18. The convex face 20 is the surface of the cutting board 18 which, in the preferred usage of the present invention, faces generally away from the user while the cutting board 18 is in use. The concave face 19 may be oriented towards the closed end 6 of the lid portion 7. This arrangement allows the concave face 19 to hold items during use. The convex face 20 may be oriented towards the closed end 6 of the base portion 4. Thus, the convex face 20 is positioned appropriately to allow for support of items placed atop the concave face 19.

Figure 5:
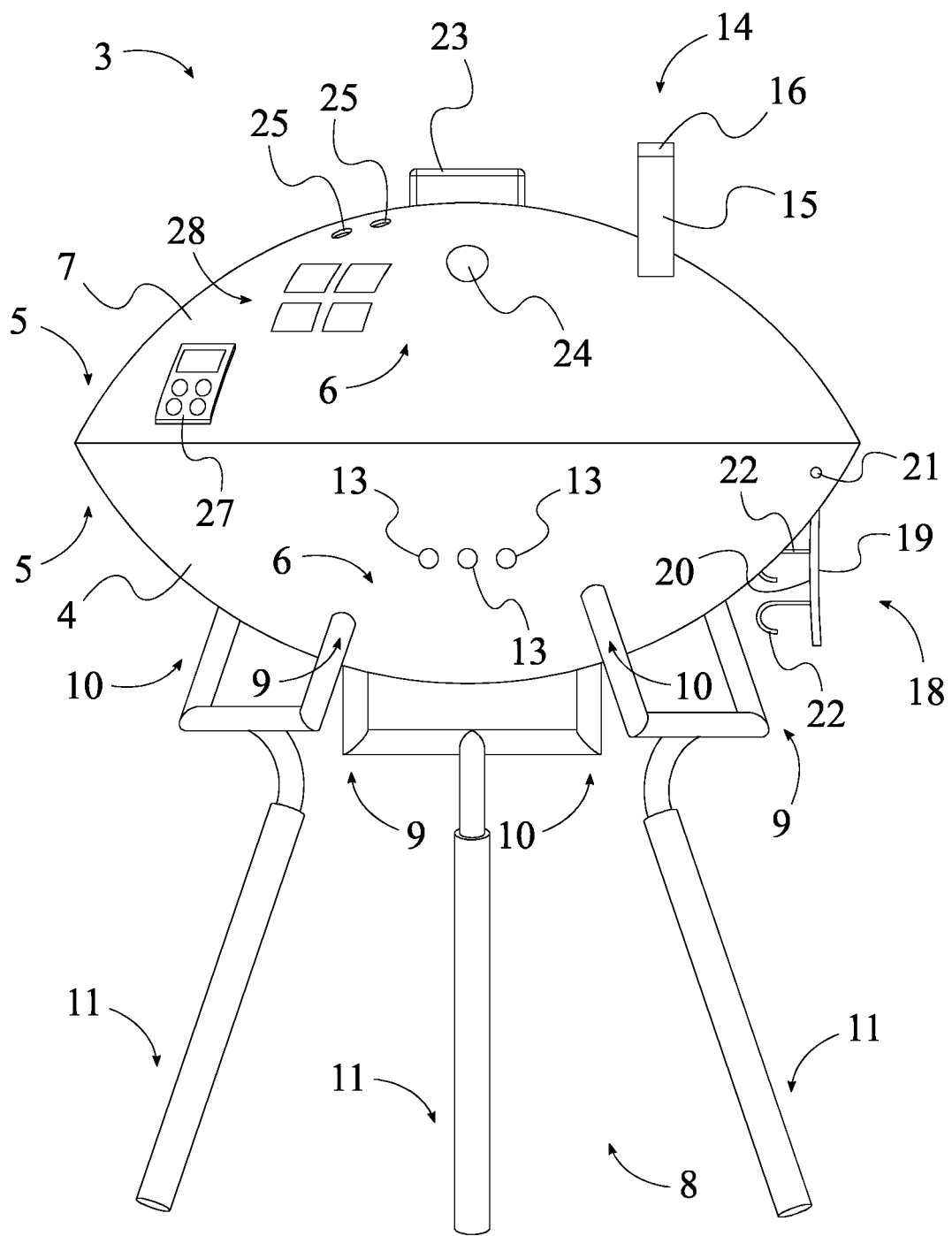
FIG. 5 is a front view of an embodiment of the present invention showing including solar panels and a cutting board with hooked cooking tool hangers.

The present invention may further benefit from the inclusion of components that allow for retention of grilling and cooking tools. To this end, the present invention may further comprise at least one grilling tool hanger 22. The at least one grilling tool hanger 22 is a set of rigid hooks, as shown in FIG. 5, or hanging rods, as shown in FIG. 7, capable of supporting sets of tongs, spatulas, brushes, and other such grilling tools. The at least one grilling tool hanger 22 may be connected adjacent to the cutting board 18. In this way, the at least one grilling tool hanger 22 may be made conveniently accessible for use in supporting cooking tools. The at least one grilling tool hanger 22 may be oriented towards the plurality of forked legs 8. This arrangement allows cooking implements to hang from beneath the cutting board 18 during the preferred usage of the present invention.

Figure 3:
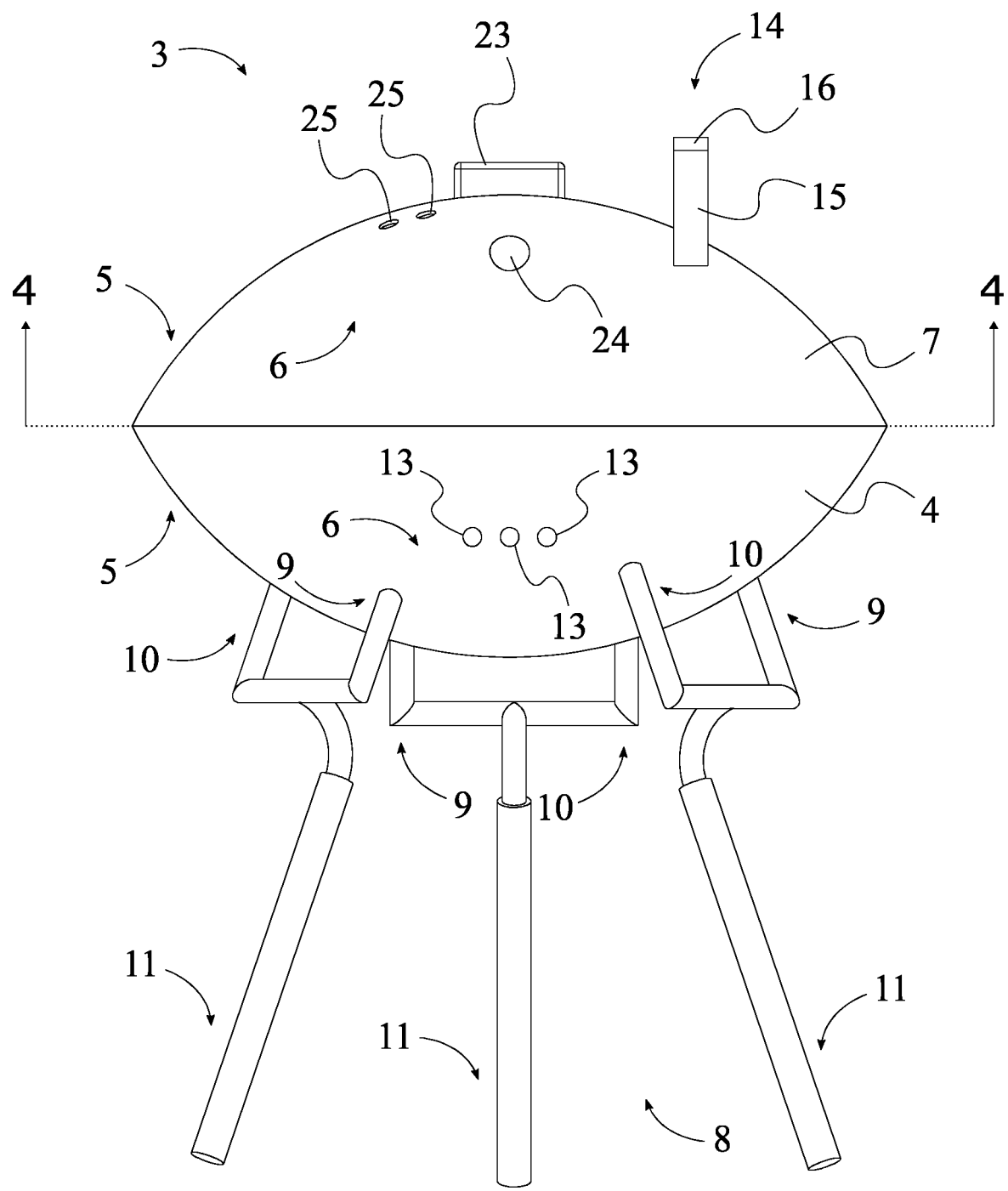
FIG. 3 is a front view of the present invention.

The user may wish to regulate the temperature, pressure, and amount of smoke contained within the oblong-shaped enclosure 3 during grilling. To allow for this, the at least one exhaust 14 may comprise a tubular body 15 and an adjustable closure 16, as shown in FIG. 3. The tubular body 15 is the structure utilized to direct fluid flow from the lid portion 7. The adjustable closure 16 is a panel that may be toggled between a position that blocks smoke from exiting the tubular body 15 and a position that allows smoke to exit the tubular body 15. The adjustable closure 16 may be positioned within the tubular body 15. This arrangement allows the user to utilize the adjustable closure 16 in order to allow or prevent the flow of smoke from the lid portion 7.

The lid portion 7 may become too hot to grasp while food is being cooked within the oblong-shaped enclosure 3. To address this issue, the present invention may further comprise a handle 23, as shown in FIG. 1. The handle 23 is a generally rigid protrusion that allows for intuitive grasping of the present invention for transportation and operation purposes. The handle 23 may be connected onto the lid portion 7. This arrangement allows the user to grasp the handle 23 to open the lid portion 7 for addition, removal, or adjustment of food.

The user may wish to monitor the temperature of the oblong-shaped enclosure 3 in order to ensure the quality of cooked foods. To this end, the present invention may further comprise a temperature sensor 24, as shown in FIG. 2. The temperature sensor 24 is a device capable of detecting and measuring ambient temperature and subsequently displaying the temperature to the user. The temperature sensor 24 may be mounted onto the lid portion 7. This arrangement allows the temperature sensor 24 to display temperature information to the user in a convenient fashion. The temperature sensor 24 may be in thermal communication with the oblong-shaped enclosure 3. Thus, the temperature sensor 24 may collect and display data that can help the user determine whether adjustments to the at least one intake 13, the at least one exhaust 14, or the oblong-shaped enclosure 3 will help food to cook correctly.

The present invention may benefit from enhanced ability to allow for the exit of gases from the oblong-shaped enclosure 3. To this end, the present invention may further comprise a plurality of adjustable ventilation openings 25, as shown in FIG. 1. The plurality of adjustable ventilation openings 25 is a set of generally circular cuts that selectively allows for air and smoke to exit the oblong-shaped enclosure 3 while cooking. Each of the plurality of adjustable ventilation openings 25 may traverse through the lid portion 7. This arrangement allows smoke and air to exit the oblong-shaped enclosure 3.

A user of the present invention may require additional cooking area for sauteing, searing, or otherwise heating foods on a flat surface within the oblong-shaped enclosure 3 while cooking. To provide for this, the present invention may further comprise an ancillary cooking panel 26, as shown in FIG. 4. The ancillary cooking panel 26 is a generally flat unit capable of retaining and distributing heat, especially to foods. The ancillary cooking panel 26 may be integrated into the grilling grate 1. This arrangement allows the ancillary cooking panel 26 to provide the extra, generally flat surface area needed by the user.

Coals, wood, and other such fuel sources are becoming generally less popular due to increasing concern over the relationship between fuel consumption and climate change. To address this potential concern, the present invention may further comprise a user controller 27 and a solar power array 28, as shown in FIG. 5. The user controller 27 denotes a combined computing device capable of managing data inputs from the user and from the present invention and an interface through which the user may control the thermal output of the solar power array 28. The solar power array 28 is a set of electrical components that allows for the capture of solar energy, conversion into electrical energy, storage, and dispensation of electrical power to the present invention. Furthermore, the grilling grate 1 may be a heatable electrically-powered grate. This arrangement allows the grilling grate 1 to provide heat to various foods appropriately. The solar power array 28 and the user controller 27 may be externally mounted to the oblong-shaped enclosure 3. In this way, the solar power array 28 is positioned appropriately for the collection of solar energy and the user controller 27 is positioned intuitively for operation by the user. The solar power array 28 may be positioned onto the closed end 6 of the lid portion 7. In this way, the solar power array 28 may be located adjacent to any solar panels or other solar energy-harnessing tools. The solar power array 28 may be electrically connected to the heatable electrically-powered grate. This arrangement allows the solar power array 28 to provide necessary electrical power to the heatable electrically-powered grate. The user controller 27 may be electrically connected to the heatable electrically-powered grate. Thus, the user controller 27 may control the thermal output of the heatable electrically-powered grate.

Although the invention has been explained in relation to its preferred embodiment, it is to be understood that many other possible modifications and variations can be made without departing from the spirit and scope of the invention as hereinafter claimed.

What is claimed is:

1. A football-themed cooking grill comprising:
   a grilling grate;
   an oblong-shaped enclosure;
   a plurality of forked legs;
   at least one branding feature;
   at least one intake;
   at least one exhaust;
   the oblong-shaped enclosure comprising a base portion and a lid portion;
   the base portion and the lid portion each comprising an open end and a closed end;
   each of the plurality of forked legs comprising a first proximal leg end, a second proximal leg end, and a distal leg end;
   the base portion being hingedly connected to the lid portion;
   the grilling grate being removably mounted across the open end of the base portion;
   the at least one branding feature being integrated into the grilling grate;
   the plurality of forked legs being radially positioned around the closed end of the base portion;
   the first proximal leg end and the second proximal leg end being fixed onto the base portion, adjacent to the closed end of the base portion;
   the first proximal leg end and the second proximal leg end being positioned offset from each other;
   the distal leg end being oriented away from the open end of the base portion;
   the at least one intake being integrated into the base portion; and
   the at least one exhaust being integrated into the lid portion.

2. The football-themed cooking grill as claimed in claim 1 comprising:
the grilling grate comprising at least one cookware-receiving indentation;
the at least one cookware-receiving indentation being integrated into the grilling grate; and
the at least one cookware-receiving indentation being oriented towards the closed end of the lid portion.

3. The football-themed cooking grill as claimed in claim 2 comprising:
a cooking pot; and
the cooking pot being situated into the at least one cookware-receiving indentation.

4. The football-themed cooking grill as claimed in claim 1 comprising:
a cutting board;
a lockable hinge mechanism; and
the cutting board being connected adjacent to the open end of the base portion by the lockable hinge mechanism.

5. The football-themed cooking grill as claimed in claim 4 comprising:
the cutting board comprising a concave face and a convex face;
the concave face being oriented towards the closed end of the lid portion; and
the convex face being oriented towards the closed end of the base portion.

6. The football-themed cooking grill as claimed in claim 4 comprising:
at least one grilling tool hanger;
the at least one grilling tool hanger being connected adjacent to the cutting board; and
the at least one grilling tool hanger being oriented towards the plurality of forked legs.

7. The football-themed cooking grill as claimed in claim 1 comprising:
the at least one exhaust comprising a tubular body and an adjustable closure; and
the adjustable closure being positioned within the tubular body.

8. The football-themed cooking grill as claimed in claim 1 comprising:
a handle; and
the handle being connected onto the lid portion.

9. The football-themed cooking grill as claimed in claim 1 comprising a temperature sensor;
the temperature sensor being mounted onto the lid portion; and
the temperature sensor being in thermal communication with the oblong-shaped enclosure.

10. The football-themed cooking grill as claimed in claim 1 comprising:
a plurality of adjustable ventilation openings; and
each of the plurality of adjustable ventilation openings traversing through the lid portion.

11. The football-themed cooking grill as claimed in claim 1 comprising:
an ancillary cooking panel; and
the ancillary cooking panel being integrated into the grilling grate.

12. The football-themed cooking grill as claimed in claim 1 comprising:
a user controller;
a solar power array;
the grilling grate being a heatable electrically-powered grate;
the solar power array and the user controller being externally mounted to the oblong-shaped enclosure;
the solar power array being positioned onto the closed end of the lid portion;
the solar power array being electrically connected to the heatable electrically-powered grate; and
the user controller being electrically connected to the heatable electrically-powered grate.

* * * * *